(12) United States Patent
Morris et al.

(10) Patent No.: US 10,762,505 B1
(45) Date of Patent: Sep. 1, 2020

(54) AUTHENTICATION TRANSACTION

(71) Applicant: Wells Fargo Bank, N.A., San Francisco, CA (US)

(72) Inventors: Timothy H. Morris, Lexington, NC (US); Lynn A. Smith, Statesville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 550 days.

(21) Appl. No.: 15/180,711

(22) Filed: Jun. 13, 2016

(51) Int. Cl.
  *G06Q 20/40* (2012.01)
  *G06Q 20/36* (2012.01)
  *G06Q 20/10* (2012.01)
  *G06Q 20/20* (2012.01)

(52) U.S. Cl.
  CPC ... *G06Q 20/40145* (2013.01); *G06Q 20/1085* (2013.01); *G06Q 20/206* (2013.01); *G06Q 20/36* (2013.01)

(58) Field of Classification Search
  CPC ........ G06Q 40/00; G06Q 20/40; G06Q 20/36; G06Q 20/42; G06Q 20/38; G06Q 20/32; G06Q 20/105; G06Q 30/02
  USPC ................................. 705/41, 72, 44, 67, 39
  See application file for complete search history.

(56) References Cited

U.S. PATENT DOCUMENTS

| | | | |
|---|---|---|---|
| 7,996,888 B2 | 8/2011 | Asunmaa et al. | |
| 8,352,749 B2 | 1/2013 | Von Behren et al. | |
| 8,478,990 B2 | 7/2013 | Brown et al. | |
| 8,554,685 B2 | 10/2013 | Patterson et al. | |
| 8,831,677 B2 | 9/2014 | Villa-Real | |
| 8,864,022 B2 | 10/2014 | Hernandez | |
| 9,064,257 B2 | 6/2015 | Beigi | |
| 9,912,483 B2 | 3/2018 | Carlson et al. | |
| 10,064,033 B2 | 8/2018 | Raleigh | |
| 10,192,216 B2 | 1/2019 | Hammad | |
| 10,195,513 B2 | 2/2019 | Tran et al. | |
| 10,255,419 B1 | 4/2019 | Kragh | |
| 10,270,748 B2 | 4/2019 | Briceno et al. | |
| 10,311,433 B2 | 6/2019 | Carrott | |
| 10,387,881 B2 | 8/2019 | Studnitzer | |
| 2006/0149671 A1 | 7/2006 | Nix et al. | |
| 2008/0046366 A1* | 2/2008 | Bemmel | H04L 9/32 705/44 |
| 2009/0254479 A1 | 10/2009 | Pharris | |
| 2010/0153274 A1 | 6/2010 | Jakonsson et al. | |
| 2010/0332389 A1 | 12/2010 | Al-Sahli | |
| 2012/0084203 A1* | 4/2012 | Mehew | G06O 20/105 705/41 |
| 2012/0101951 A1 | 4/2012 | Li et al. | |

(Continued)

*Primary Examiner* — Olusegun Goyea
(74) *Attorney, Agent, or Firm* — Schwegman Lundberg & Woessner, P.A.

(57) ABSTRACT

Various examples are directed to systems and methods for authentication transactions. A mobile computing device may send to a financial institution system, an access request message. The mobile computing device may receive from a second server system, a transaction request message requesting authorization for a transaction on an account associated with the mobile computing device, the transaction request including a transaction amount. The mobile computing device may prompt a user of the mobile computing device to authorize the transaction. The mobile computing device may receive, from the financial institution system, summary data describing the transaction amount.

17 Claims, 11 Drawing Sheets

(56) References Cited

U.S. PATENT DOCUMENTS

| | | |
|---|---|---|
| 2012/0143737 A1 | 6/2012 | Pousti |
| 2012/0246079 A1* | 9/2012 | Wilson ............. G06Q 20/40145 |
| | | 705/67 |
| 2012/0296823 A1 | 11/2012 | Pousti |
| 2012/0323717 A1 | 12/2012 | Kirsch |
| 2014/0129447 A1 | 5/2014 | Ranalli et al. |
| 2015/0019441 A1 | 1/2015 | Brown |
| 2015/0020162 A1 | 1/2015 | Hefetz |
| 2015/0095219 A1* | 4/2015 | Hurley ............... G06Q 20/3829 |
| | | 705/39 |
| 2015/0379510 A1 | 12/2015 | Smith |
| 2016/0092878 A1* | 3/2016 | Radu .................. G06Q 20/4014 |
| | | 705/72 |
| 2016/0180333 A1* | 6/2016 | Leyva ................. G06Q 20/363 |
| | | 705/41 |
| 2016/0232515 A1 | 8/2016 | Jhas et al. |
| 2016/0321721 A1 | 11/2016 | Stein |
| 2016/0342989 A1* | 11/2016 | Davis .................. G06Q 20/385 |
| 2016/0358199 A1* | 12/2016 | Van Os ............ G06Q 20/40145 |
| 2018/0233225 A1 | 8/2018 | Experton et al. |
| 2018/0293573 A1 | 10/2018 | Ortiz et al. |
| 2019/0205148 A1 | 7/2019 | Schur |
| 2019/0295074 A1 | 9/2019 | Carrott |

\* cited by examiner

AUTHENTICATION TRANSACTION

TECHNICAL FIELD

Embodiments described herein generally relate to authentication, for example and without limitation, authentication including initiating a transaction to a user account for authentication.

BACKGROUND

Authentication methods are used by parties to an electronic transaction to verify the identity of a counter party.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
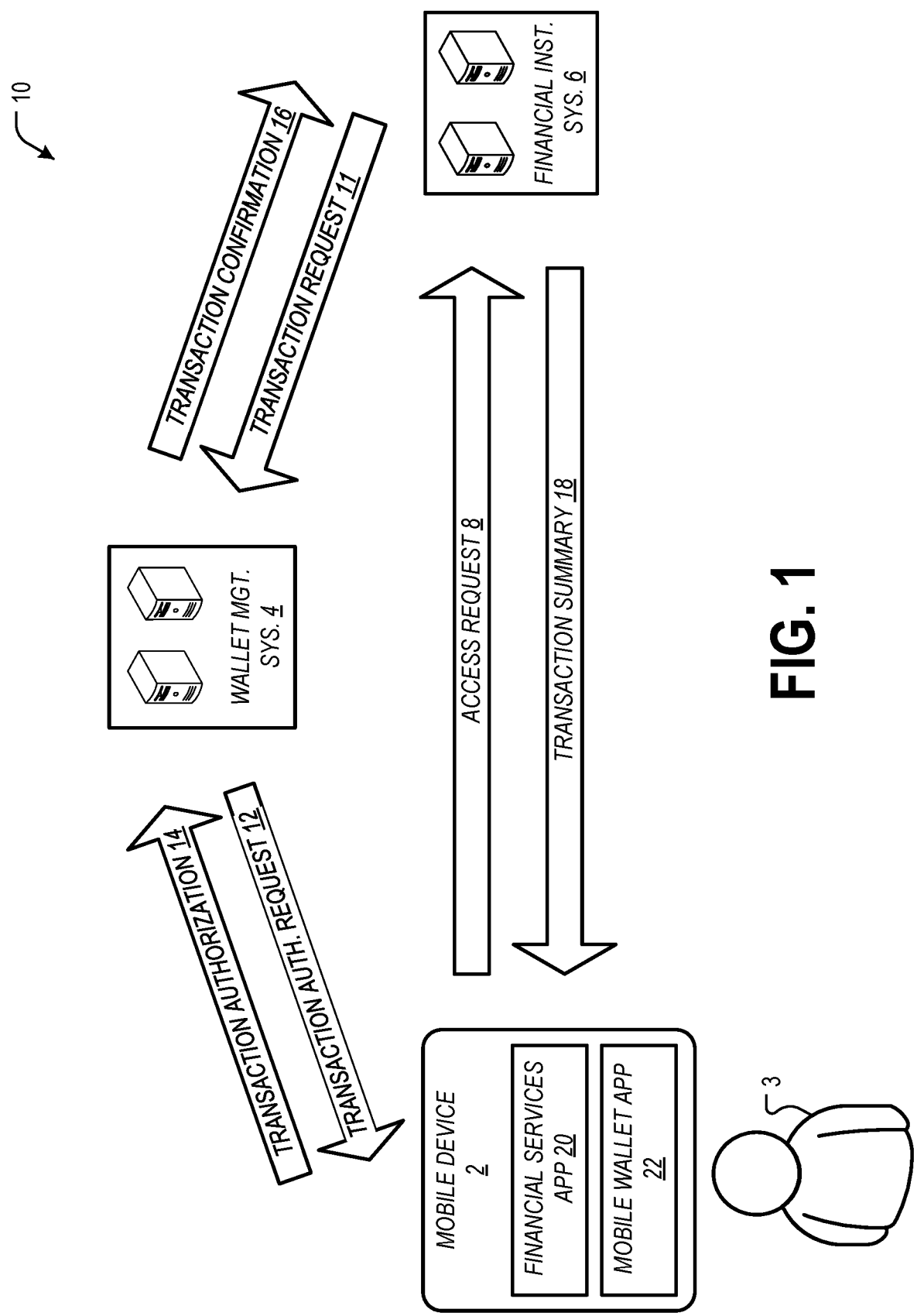
FIG. 1 is a diagram showing an example of an environment for authentication utilizing a transaction to a financial account of a user.

Various examples described herein are directed to authentication that includes a transaction to a user's financial account. The user may request access to a financial service provided by a financial institution through a financial institution system. The user may make the request from a financial services application executing at a computing device, such as a mobile computing device. For example, the user may be a customer of the financial institution. The financial service may be any suitable financial service offered by the financial institution including, for example, an account management service, an online bill pay service, a loan application service, etc.

In some examples, both the user and the financial institution system may verify the identity of the other at least in part through a transaction to a financial account of the user, such as a financial account held at the financial institution. For example, upon receiving the access request from the user, the financial institution system may send a transaction request to a second server system requesting a transaction to the account of the user. The transaction may be a credit or debit to the account, such as of a small amount, such as a few cents. In some examples, the transaction may include both a credit and an equivalent debit to the user's account.

The second server system may be a wallet management system programmed to manage one or more financial accounts of the user. The transaction request may include transaction description data including a transaction amount and an identity of the financial account. The second server system may prompt the user to authorize the requested transaction. For example, the second server system may send a transaction request message to a mobile wallet application executing at the mobile computing device of the user. The user may receive the transaction request message and reply to the second server system with a transaction authorization message, for example, via the mobile wallet application. In some examples, the transaction authorization message may include identifying data from the user, such as, for example, user name data including a user name, password data including a password, personal identification number (PIN) data including a PIN, biometric data captured from the user, etc. The second server system may verify the identifying data and continue and/or complete the transaction. The second server system may send the financial institution system a transaction confirmation message indicating that the user has authorized the transactions. The financial institution system may send the user a transaction summary message including transaction amount data.

In some examples, both the user and the financial institution may utilize the transaction process to verify the identity of the other. For example, the user may be unlikely to authorize the transaction if it is unexpected. Accordingly, the party that authorizes the transaction is likely to be the same party that made the initial access request to the financial institution system. Also, the user may verify its identity to the second server system with the identifying data provided with the transaction authorization. The user, on the other hand, may receive data regarding the transaction from both from the second server system and from the financial institution system.

Although the example above is described between a user and a financial system, some examples may utilize transactions to a user financial account to authenticate users and service provider systems in other contexts. For example, the user may request access to a service provided by a first server system. The first server system may send to the second server system a transaction request requesting the transaction to the financial account of the user. The second server system may prompt a mobile computing device of the user to authorize the transaction and send a transaction confirmation message to the financial institution system. The financial institution system may send a transaction summary message to the user.

FIG. 1 is a diagram showing an example of an environment 10 for authentication utilizing a transaction to a financial account of a user 3. In the example of FIG. 1, the user 3 utilizes a mobile computing device 2. Other components in the environment 10 may include a financial institution system 6 and a wallet management system 4.

The mobile computing device 2 may be or include any computing device suitable for executing authentication of a user 3 as described herein. Example mobile computing devices 2 may include smart phones, tablet computers, laptop computers, smart watches, etc. In the example of FIG. 1, the mobile computing device 2 executes a financial services application 20 and a mobile wallet application 22. The financial services application 20 may be a client-side and/or web application suitable for accessing one or more financial services of a financial institution. For example, the financial services application 20 may be in communication with the financial institution system 6, as described herein. The user 3, in some examples, is a customer of the financial institution and may hold one or more financial accounts at the financial institution system.

The mobile wallet application 22 may be a client-side and/or web application suitable for managing payments to or from one or more financial accounts of the user 3. The mobile wallet application 22 may implement a mobile wallet service for the user 3, for example, in conjunction with the wallet management system 4. The mobile wallet application 22 may enable the user 3 to make payments to and/or from various financial accounts, such as, for example, credit card accounts, debit accounts, line-of-credit accounts, checking accounts, savings accounts, etc. Examples of mobile wallet services that may be used for authentication as described herein include APPLE PAY, GOOGLE WALLET, SOFT-CARD, etc. One or more accounts managed by the mobile wallet service may be held by the user 3 with the financial institution system 6.

The financial institution system 6 may be any suitable computing system for providing users, such as the user 3, with one or more financial services, such as an account management service, an online bill pay service, a loan application service, etc. For example, the financial institution system 6 may be configured to communicate with the mobile computing device 2 and with the financial services application 20 described herein. In some examples, the financial institution system 6 may be configured to communicate with another computing device of the user 3 in addition to or instead of the mobile computing device 2. The financial institution system 6 may comprise one or more computing devices, such as servers, configured to operate as described herein. Computing devices making up the financial institution system 6 may be located at a single geographic location and/or may be distributed across multiple geographic locations. In some examples, the financial institution system 6 may be implemented in a "cloud computing" environment or as a "software as a service" (SaaS). For example, at least some of the operations of the financial institution system 6 may be performed by a group of computing devices, with these operations being accessible via a network and/or via one or more appropriate interfaces (e.g., an Application Program Interface (API)).

The wallet management system 4 may be any suitable computing system for providing users, such as the user 3 with a mobile wallet service. The wallet management system 4 may be configured to communicate with the mobile computing device 2 and with the mobile wallet application 22 described herein. The wallet management system 4 may comprise one or more computing devices, such as servers, configured to operate as described herein. Computing devices making up the wallet management system 4 may be located at a single geographic location and/or may be distributed across multiple geographic locations. In some examples, the wallet management system 4 may be implemented in a "cloud computing" environment or as a "software as a service" (SaaS). For example, at least some of the operations of the wallet management system 4 may be performed by a group of computing devices, with these operations being accessible via a network and/or via one or more appropriate interfaces (e.g., an Application Program Interface (API)).

FIG. 1 also shows an example workflow for authentication in the environment 10. The mobile computing device 2 (e.g., the financial services application 20) may send an access request message 8 to the financial institution system. The access request message 8 may comprise a request to access one or more financial services offered by the financial institution system 6. In some examples, the access request message 8 is sent at the beginning of a communication session between the financial services application 20 and the financial institution system 6, for example, as part of a sign-in process. In some examples, the access request message 8 may be sent when the mobile computing device 2 requests access to a particular financial service offered by the financial institution system 6 (e.g., after an initial sign-in).

In response to the access request, the financial institution system 6 may direct a transaction request message 11 to the wallet management system 4. The transaction request message 11 may request that the wallet management system 4 initiate a transaction to a financial account of the user 3. The transaction request message 11 may include transaction data describing the user 3 such as, for example, a name of the user 3, an account number of a financial account held by the user, etc. The transaction request message 11 may also include financial institution system data describing the financial institution system 6. In some examples, the transaction request message 11 may include a requested transaction amount or in some examples, the transaction request message 11 may request a transaction without specifying the transaction amount. For example, the wallet management system 4 may select the amount of the transaction. In some examples, the wallet management system 4 may have or request authentication of the financial institution system 6. For example, the financial institution system 6 may provide a digital certificate indicating its identity (e.g., its association with an implementing financial institution). Any other form of digital authentication may be used. When the financial institution authenticates itself to the wallet management system 4, it may do so at or about the time that the transaction request message 11 is sent or, in some examples, may do so prior to the sending of the transaction request message 11.

The wallet management system 4, upon receiving the transaction request message 11, may send a transaction authorization request message 12 to the mobile wallet application 22 executing at the mobile computing device 2. In some examples, the transaction authorization request message 12 may comprise data instructing the mobile wallet application 22 to prompt the user 3 to authorize the transaction. The mobile device (e.g., the mobile wallet application 22) may prompt the user 3 to authorize the transaction. In some examples, the transaction authorization request message may also include data describing the transaction including, for example, a transaction amount, a counterparty to the transaction, etc. In an example, the transaction authorization request message 12 may cause the mobile wallet application 22 to display the following message at the mobile computing device 2:

Financial Institution X would like to apply a credit of $0.07 to your account Y. Do you authorize this transaction?

In some examples, the transaction may include multiple credits and/or debits to the user's financial account, for example, credits and debits that offset and/or sum to zero. Accordingly, another example message that the mobile wallet application 22 may cause to display at the mobile computing device 2 is below:

Financial Institution X would like to apply a credit of $0.07 and a debit of $0.07 to your account Y. Do you authorize this transaction?

In some examples, the transaction authorization request may also include data describing the nature of the access request message 8. For example, another message that the mobile wallet application 22 may cause to display at the mobile computing device 2 is below:

Financial Institution X would like to apply a credit of $0.07 cents to your account Y as part of your request to access a financial service at Financial Institution X. Do you authorize this transaction?

In some examples, the message may specify the financial service that was requested. Although a transaction amount of $0.07 is listed in these examples, any suitable transaction amount may be used including, in some examples, transaction amounts that are fractions of a cent.

The user 3 may authorize the requested transaction, for example, if the user 3 expects the transaction request and/or recognizes the source. For example, if the access request message 8 is sent by an imposter, and not by the user 3, then the user 3 may not authorize the transaction. Also, for example, if the user 3 does not recognize the requesting party (e.g., the financial institution or Financial Institution system 6), then the user may not authorize the transaction.

Provided that the user 3 is to authorize the transaction, the user 3 may provide authorization in any suitable manner. For example, authorization may be performed through the mobile wallet application 22. For example, the mobile wallet application 22 may prompt the user 3 to provide identifying data. The identifying data may include, for example, a user name, a password, a personal identification number (PIN). In some examples, the mobile wallet application 22 may prompt the user 3 to provide biometric data. Biometric data may include any data describing the user's person. In some examples, the mobile computing device 2 may include a touch sensor suitable for capturing a fingerprint of the user. For example, the biometric data may include a representation of the user's fingerprint. In some examples, the mobile computing device 2 may include a camera suitable for capturing an image of the user 3 (e.g., the user's face). For example, the biometric data may include an image of the user (e.g., the user's face). In some examples, the mobile computing device 2 may include an optical scanner suitable to capture a retinal scan of the user's eye. For example, the biometric data may include data describing the retinal scan. Although several examples of biometric data are provided and may be used in any combination, other types of biometric data may be utilized in addition to or instead of the provided examples.

Upon receiving authorization for the transaction from the user 3, the mobile wallet application 22 may send a transaction authorization message 14 to the wallet management system 4. The transaction authorization message 14 may include authorization data indicating the user's authorization of the transaction. In some examples, the transaction authorization message 14 may also include the identity data and/or biometric data received from the user 3. The wallet management system 4 may receive the transaction authorization message 14. When the transaction authorization message 14 includes identity data and/or biometric data, the wallet management system 4, the wallet management system 4 may determine whether the identity data and/or biometric data matches reference identity data and/or reference biometric data for the user 3 stored at and/or otherwise accessible to the wallet management system 4. For example reference identity data including a password may be referred to as reference password data. If the identity and/or biometric data contained in the transaction authorization message 14 matches the reference user identity data for the user 3, the wallet management system 4 may complete the transaction.

The wallet management system 4 may complete the transaction in any suitable manner. For example, the wallet management system 4 may communicate with a system associated with an organization that holds the financial account on behalf of the user 3. For example, when the financial account is a credit card account, the wallet management system 4 may communicate with a system implemented by the credit card company associated with the credit card account. Also, for example, when the financial account is a checking, savings, or other suitable account held at a retail bank, the wallet management system 4 may communicate with a system implemented by the retail bank.

The wallet management system 4 may also send a transaction confirmation message 16 to the financial institution system 6. The transaction confirmation message 16 may include data indicating that the user 3 has authorized the transaction. In some examples, the transaction confirmation message 16 may also include data describing the transaction such as, for example, the transaction amount, timestamp data indicating a time of one or more processing steps for executing the transaction (e.g., transaction completion, request, etc.). The financial institution system 6 may receive the transaction confirmation message 16 and may generate a transaction summary message 18 and send it to the mobile computing device 2 (e.g., the financial services application 20). The transaction confirmation message 16 may include some or all of the data describing the transaction. The transaction summary message 18 may include transaction summary data summarizing the transaction to the mobile device 2. In some examples, the financial institution system 6 may also approve the access request message 8.

Figure 2:
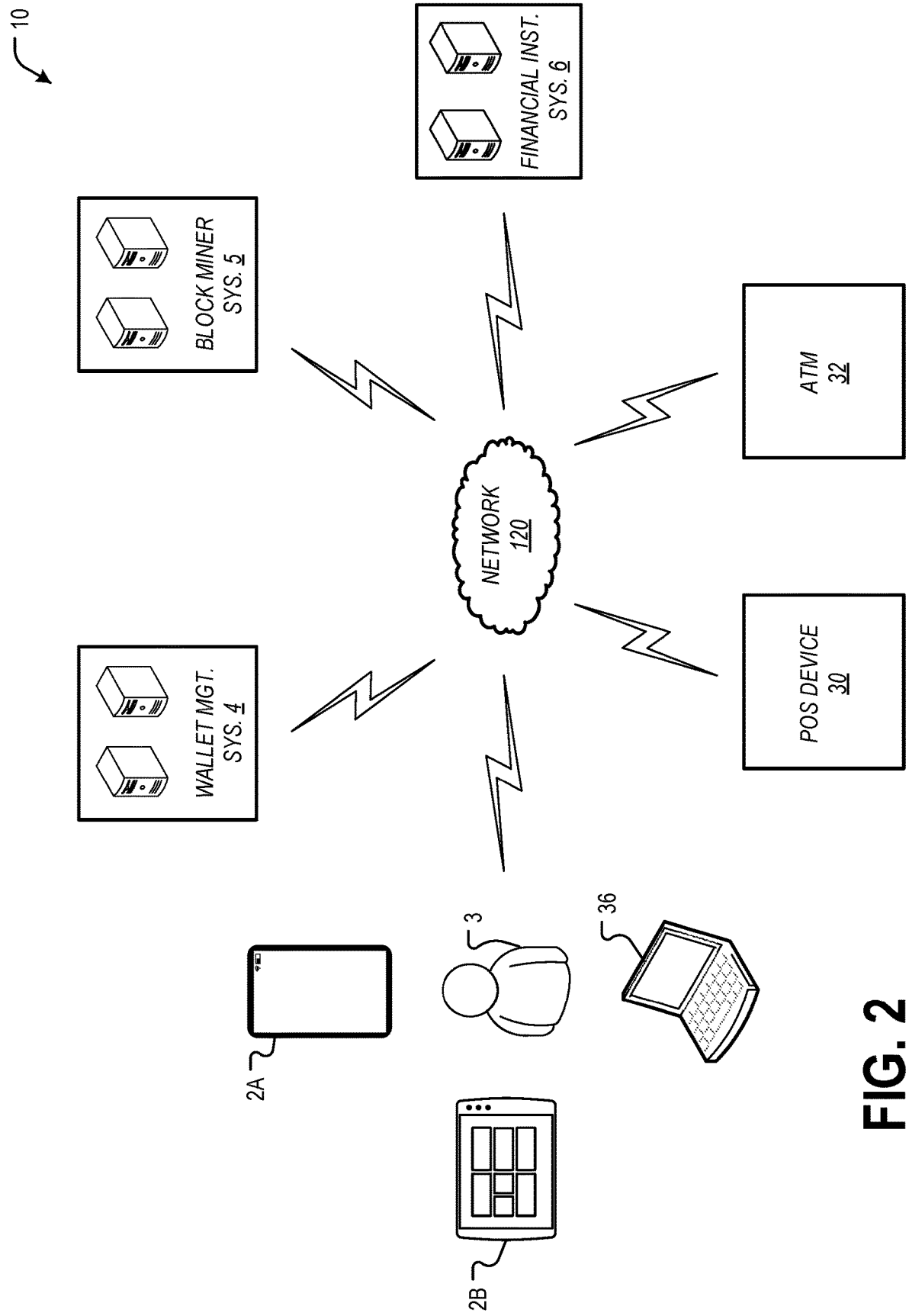
FIG. 2 is a diagram showing another example of the environment of FIG. 1 with additional components.

FIG. 2 is a diagram showing another example of the environment 10 of FIG. 1 with additional components. For example, FIG. 2 shows user computing devices 2A, 2B, 36, as well as an example point-of-sale (POS) device 30 and an example automated teller machine (ATM) 32. User computing devices may include example mobile computing devices 2A, 2B and an additional computing device 36. Mobile computing devices 2A, 2B, for example, may be used by the user 3 to authorize an authentication transaction, as described herein. Mobile computing devices 2A, 2B may include any suitable type of computing device or devices. For example, mobile computing device 2A may be a mobile phone. Mobile computing device 2B may be a tablet computer. Any other suitable type of mobile computing device may be used. In some examples, mobile computing devices, such as 2A, 2B may be configured to communicate in a wireless manner.

FIG. 2 also shows the POS device 30 and ATM 32. These devices, in some examples, may be part of authentication as described herein. The POS device 30 may be a device associated with any party that receives payments, such as an online or bricks-and-mortar merchant. The POS device 30 may comprise a processing unit and various other computing components. In some examples, the POS device 30 may be or comprise a computing device configured, for example, according to one or more of the hardware or software architectures described herein. The POS device 30 may be configured to communicate with a mobile computing device 2A, 2B (e.g., a mobile wallet application 22 executing at the mobile computing device 2A, 2B) using any suitable contact or a contactless medium. In some examples, the POS device 30 may be configured to communicate with a mobile computing device 2A, 2B utilizing a short range communication medium such as, a Bluetooth connection, a Bluetooth LE connection, a Near Field Communications (NFC) connection, an infrared connection, etc. In some examples, the POS device 30 may request an authentication transaction, for example, when the user 3 requests that a payment be made to a retailer associated with the POS device 30. For example, the payment may be the service accessed by the user 3.

The ATM 32 may be implemented by a financial institution and/or a third party administrator to provide the user 3 with financial services, such as, for example, cash withdrawals, balance checks, etc. The ATM 32 may comprise a processing unit and various other computing components. In some examples, the ATM 32 may be or comprise a computing device configured, for example, according to one or more of the hardware or software architectures described herein. In some examples, the ATM 32 may request an authentication transaction, for example, when the user request a financial service from the ATM 32. Although FIG. 2 shows a single example of various components, in some examples, additional instances of users 3, mobile computing devices 2A, 2B, computing devices 36, wallet management systems 4, financial institution systems 6, ATMs 32 and/or POS devices 30 may be included in additional to or instead of those shown.

FIG. 2 also shows an optional block miner system 5. The block miner system 5 may be present in some examples where block chains of transaction authentications are utilized to identify the user 3 and/or a counterparty, such as the financial institution system 6, the POS device 30, the ATM 32, etc. Although one block miner system 5 is shown, additional block miner systems 5 may be included. Block miner systems 5 may be implemented by any suitable party. Additional examples describing the use of block chains of transaction authentications are described herein, for example, with respect to FIG. 9.

The various components 2A, 2B, 5, 6, 30, 32, 36, etc. of the environment 10 may be in communication with one another via a network 120. The network 120 may be or comprise any suitable network element operated according to any suitable network protocol. For example, one or more portions of network 120 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
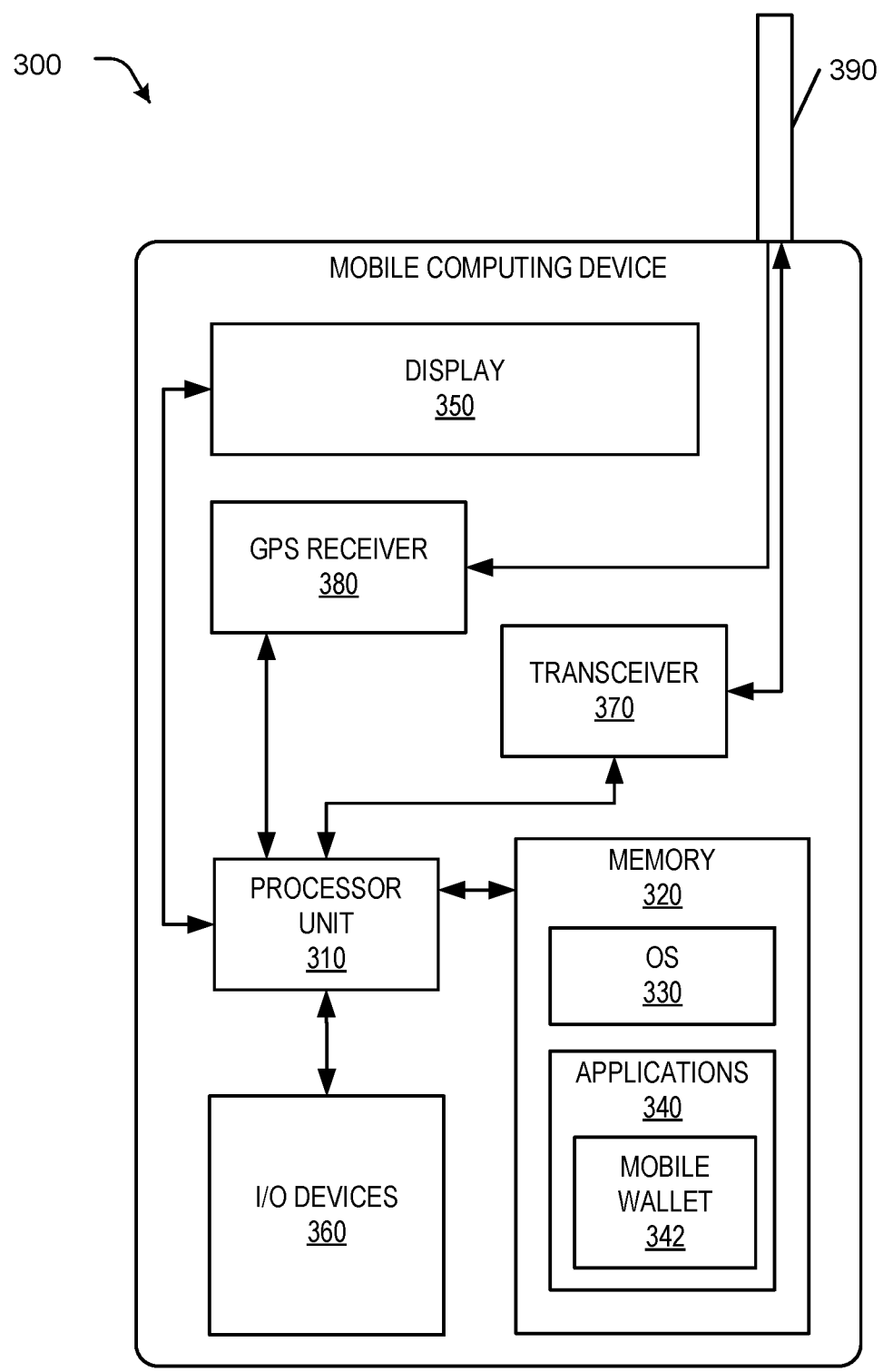
FIG. 3 is a block diagram showing an example architecture of a mobile computing device.

FIG. 3 is a block diagram showing an example architecture 300 of a mobile computing device. Any of the mobile computing devices 2, 2A, 2B, for example, may be implemented according to the architecture 300. The architecture 300 comprises a processor unit 310. The processor unit 310 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory or data storage, is typically accessible to the processor. The memory 320 may be adapted to store an operating system (OS) 330, as well as application programs 340.

The processor unit 310 may be coupled, either directly or via appropriate intermediary hardware, to a display 350 and to one or more input/output (I/O) devices 360, such as a keypad, a touch panel sensor, a microphone, and the like. In some examples I/O devices 360 may include one or more devices for receiving biometric data from a user (e.g., the user 3). Such I/O devices 360 may include a touch sensor for capturing fingerprint data, a camera for capturing one or more images of the user, a retinal scanner, or any other suitable devices. Similarly, in some examples, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile computing device implemented by the architecture 300. Although one transceiver 370 is shown, in some examples, the architecture 300 includes additional transceivers. For example, a wireless transceiver may be utilized to communicate according to an IEEE 802.11 specification, such as Wi-Fi and/or to a short range communication medium. Some short range communication mediums, such as NFC, may utilize a separate, dedicated transceiver. Further, in some configurations, a GPS receiver 380 may also make use of the antenna 390 to receive GPS signals.

Figure 4:
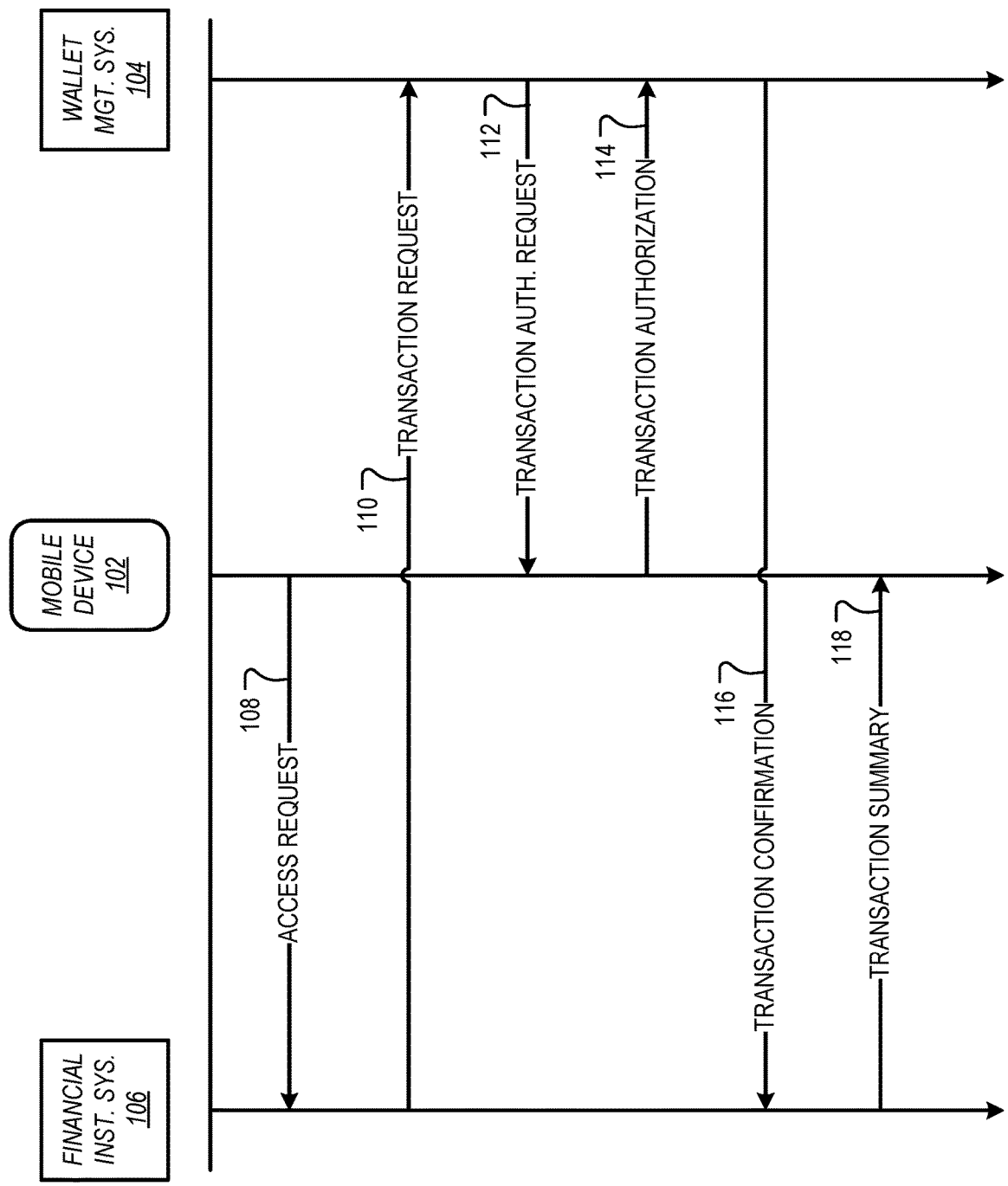
FIG. 4 is a timing diagram showing one example of an authentication utilizing a transaction to a financial account of a user.

FIG. 4 is a timing diagram showing one example of an authentication utilizing a transaction to a financial account of a user. For example, the authentication illustrated by the workflow of FIG. 1 may be implemented according to the timing shown in FIG. 4. The timing diagram shows three parties, a financial institution system 106, a wallet management system 104 and a mobile computing device 102.

The mobile computing device 102 (e.g., a financial services application executing at the mobile computing device 102) may send to the financial institution system 106 an access request message 118. The access request message 118 may initiate the authentication. In some examples, however, the financial institution system 106 may initiate the authentication by soliciting the access request 108 with an access solicitation message. The financial institution system 106 may send to the wallet management system 104 a transaction request message 110. The wallet management system may send the mobile computing device 102 (e.g., a mobile wallet application executing at the mobile computing device) a transaction authorization request 112. In response, the mobile computing device 102 may provide a transaction authorization message 114. The transaction authorization message 114 may include identifying information and/or biometric information as described. The wallet management system 104 may send a transaction confirmation message 116 to the financial institution system indicating that the user has confirmed the transaction. The financial institution system 106 may send a transaction summary message 118 to the mobile computing device 102.

In various implementations, the timing shown by the timing diagram may be modified from what is shown in FIG. 4. In some examples, the financial institution system 106 may send the transaction summary message 118 before receiving the transaction confirmation message 116.

Figure 5:
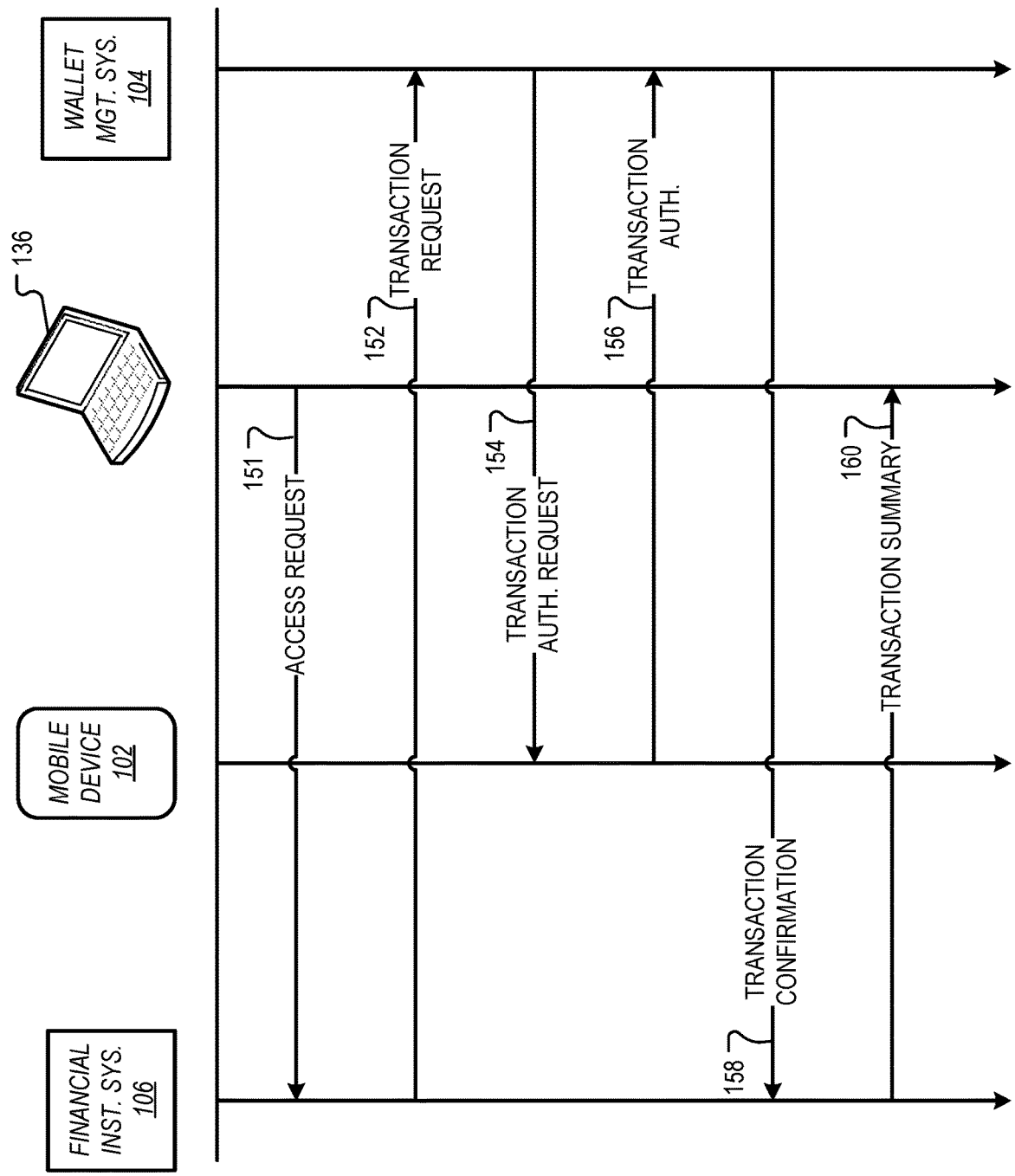
FIG. 5 is a timing diagram showing one example of an authentication utilizing a transaction to a financial account of a user involving a user mobile computing device and a second user computing device.

FIG. 5 is a timing diagram showing one example of an authentication utilizing a transaction to a financial account of a user involving a user mobile computing device 102 and a second user computing device 136. The second user computing device 136 may be or include, for example, a desktop computer, a laptop computer, etc. In some examples, the second user computing device 136 may execute a financial services application for accessing financial services executed by the financial institution system 106. The user may utilize the second user computing device 136 to send an access request message 151 to the financial institution system. The access request message 151 may include a request to access one or more financial services offered by the financial institution system 106.

In response to the access request message 151, the financial institution system 106 may send a transaction request message 152 to the wallet management system 104. The transaction request message 152 may include data requesting that the wallet management system 104 initiate a transaction to a financial account of the user. The wallet management system 104 may send a transaction request authorization request message 154 to the mobile computing device 102 of the user. For example, the mobile computing device 102 and/or a mobile wallet application executing at the mobile computing device may be associated with the selected user and/or financial account at the wallet management system 104. The mobile computing device 102 may respond to the transaction authorization request message 154 by sending to the wallet management system 104 a transaction authorization message 156, which may include user identity and/or biometric data, as described herein. The wallet management system 104 may send to the financial institution system 106 a transaction confirmation message 158 indicating that the transaction has been authorized by the user. The financial institution system 106 may send a transaction summary message 160 to the second user computing device 136. Various modifications to the timing of the messages of the timing diagram may also be made, for example, as described herein.

Figure 6:
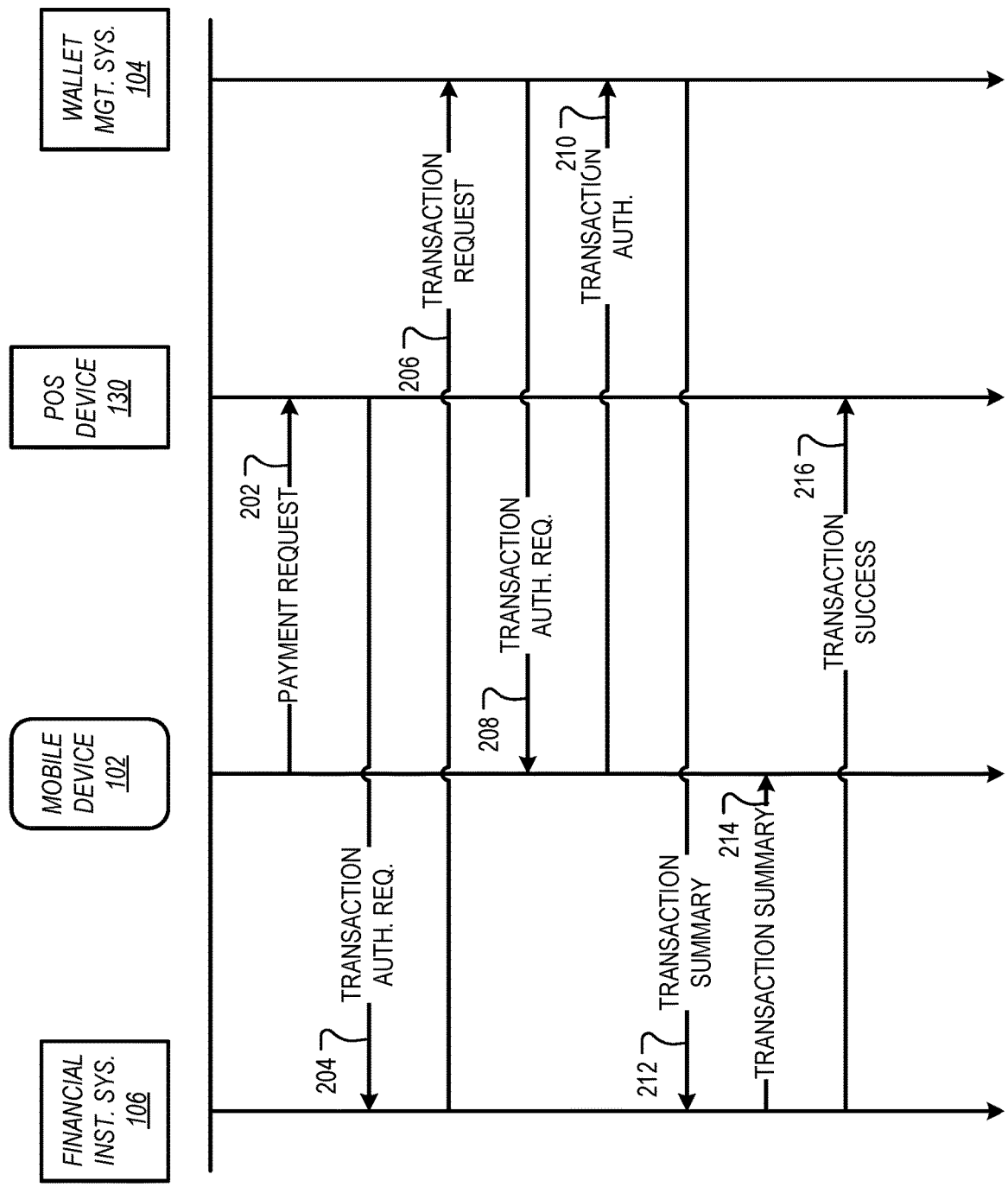
FIG. 6 is a timing diagram showing one example of an authentication used in the context of a payment from the user to a merchant.

FIG. 6 is a timing diagram showing one example of an authentication used in the context of a payment from the user to a merchant. For example, when a user requests a payment to a merchant, it may be desirable for the user and merchant to authenticate one another. In this way, the merchant may receive an indication that that the proffered payment is legitimate (e.g., actually proffered by the user who is the owner of the account used for the payment). Further, the user may receive an indication that the recipient of the payment is actually the merchant and not a third party (e.g., a third party engaged in a phishing operation to obtain the user's account credentials).

According to the timing diagram of FIG. 6, the merchant or other recipient of a payment from the user (e.g., the payee) is represented as POS device 130. In some examples, all or part of the functionality ascribed to the POS device 130 may be executed by other components associated with the payee such as, for example, a payment server (not shown). The mobile computing device 102 may send to the POS device 130 a payment request message 202. The payment request message 202 may include data describing a payment to be made to a payee, such as a merchant. The data may include, for example, an amount of the payment, a financial account of the user from which the payment is to be made, etc. For example, the user and the payee may engage in a transaction where the payee provides goods and/or services to the user and the user is to provide the payment in return. In some examples, the payment request message 202 may be send by a mobile wallet application executing at the mobile computing device 102. The mobile computing device may communicate with the POS device 130 in any suitable manner including, for example, via a short range communication medium.

The POS device 130 may send to the financial institution system 106 a authentication request message 204. For example, the financial institution system 106 may administer the financial account of the user from which the payment is to be made. The authentication request message 204 may request that the financial institution system 106 initiate an authentication. The financial institution system 106 may send a transaction request message 206 to the wallet management system 104. The transaction request message 206 may request that the wallet management system 104 initiate a transaction, as described herein. The wallet management system 104 may send a transaction authorization request message 208 to the mobile computing device 102 (e.g., a mobile wallet application executing at the mobile computing device 102). In response to the transaction authorization request message, the mobile computing device 102 may provide a transaction authorization message 210. The transaction authorization message 210 may include user identity data and/or biometric data as described herein.

The wallet management system 104 may also send to the financial institution system a transaction summary message 212 including data describing the transaction, as described herein. The financial institution system may send a second transaction summary message 214 to the mobile computing device, which may serve to authenticate the POS device 130 to the mobile computing device 102. The transaction summary message 214, for example, may include data describing the transaction, as described herein, including, for example, a transaction amount, a transaction timestamp, etc. In some examples, the financial institution system 106 may send a transaction success message 216 to the POS device 130. The transaction success message 216 may indicate to the POS device 130 that the transaction has been successfully completed, which may serve as an authentication of the mobile computing device 102 to the POS device 130.

In some examples of the authentication of FIG. 6, the financial institution system 106 may be omitted. For example, the POS device 130 may send the authentication request message 204 directly to the wallet management system 104. For example, the wallet management system 104 may send a transaction summary message to the mobile computing device 102. Further, the wallet management system 104 may send a transaction success message to the mobile computing device.

In some examples, authentication as described herein may be executed to authenticate the user to an ATM 132 and the ATM 132 to the user. For example, the user may use the ATM 132 to access a financial service related to a financial account. The ATM 132, in some examples, may be a third-party ATM, implemented by a bank other than the financial institution administering the user's financial account. For example, it may be desirable for the user to verify that the ATM 132 is legitimately in communication with the user's financial institution and not engaged in a phishing operation to steal the user's log-in credentials. Also, it may be desirable for the ATM 132 to verify that the user is a legitimate customer of the financial institution.

Figure 7:
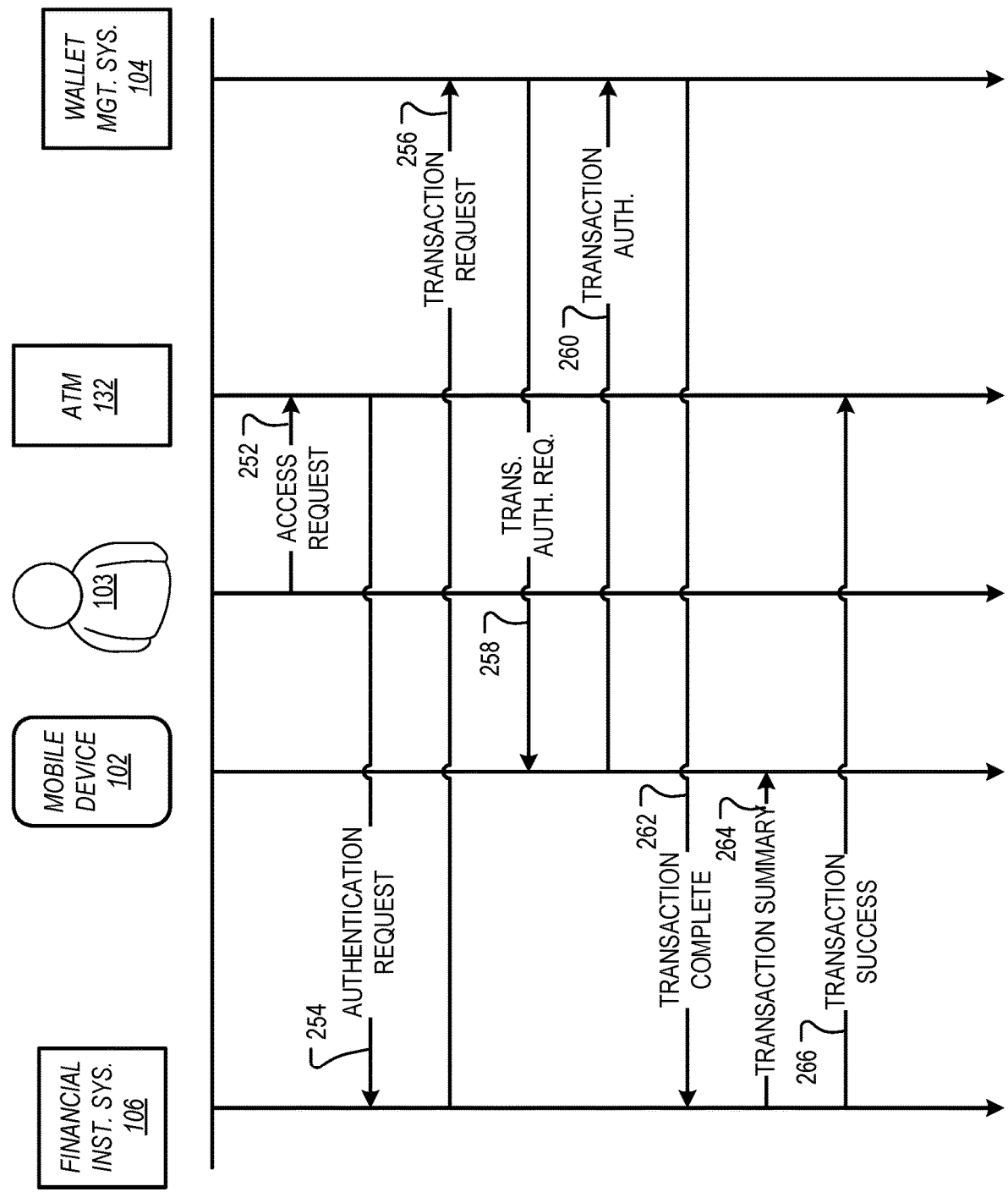
FIG. 7 is a timing diagram showing one example of an authentication used between a user and an automated teller machine (ATM).

FIG. 7 is a timing diagram showing one example of an authentication used between the user 103 and the ATM 132. The user 103 may begin the transaction by sending an access request message 252 to the ATM 132. For example, sending the access request message 252 may include allowing the ATM 132 to read an ATM or other card of the user 103 for accessing the user's financial institution services. The ATM 132 may identify the relevant financial institution from information provided in the access request message 252. In some examples, the user 103 may affirmatively request the authentication transaction.

The ATM 132 may send an authentication request message 254 to the financial institution system 106. The authentication request message 254 may requested an authentication transaction. The financial institution system 106 may send a transaction request message 256 to the wallet management system 104. In response, the wallet management system 104 may send a transaction authorization request message 258 to the mobile computing device 102 of the user 103 (e.g., to a mobile wallet application executing at the mobile computing device 102). The mobile computing device may send a transaction authorization message 260 to the wallet management system 104. As described herein, the transaction authorization message 260 may include identity data and/or biometric data describing the user 103. The wallet management system 104 may send a transaction confirmation message 262 to the financial institution system 106 indicating that the user 103 has authorized the authentication transaction. The financial institution system 106 may send a transaction summary 264 to the mobile computing device 102. The financial institution system 106 may also send a transaction success message 266 to the ATM 132. The transaction success message 266 may include data indicating to the ATM 132 that the authentication transaction was authorized and/or completed.

Figure 8:
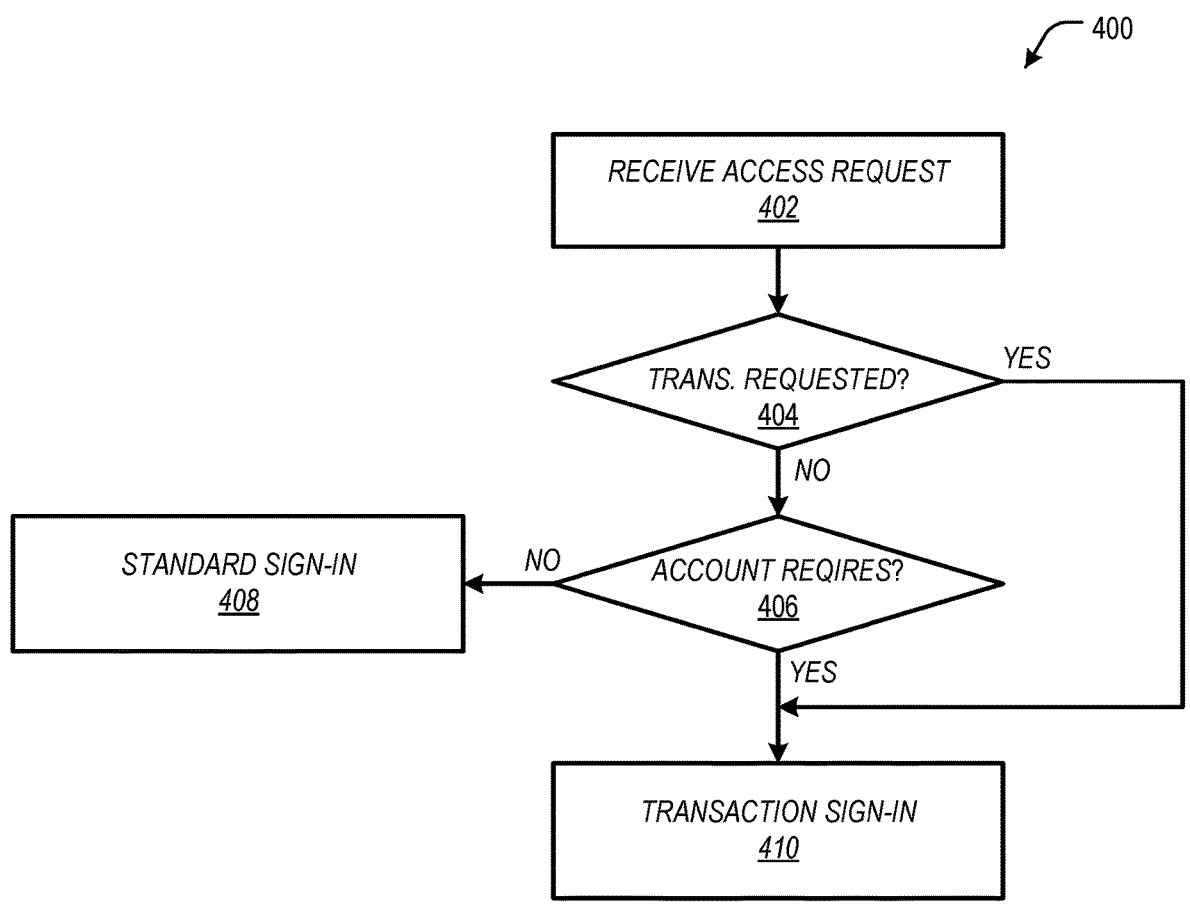
FIG. 8 is a flowchart showing one example of a process flow that may be executed by a financial institution system, point of service (POS) device, automated teller machine ATM or other counterparty to a user service request to determine whether to request an authentication transaction.

In some examples, the user may access financial services, initiate a payment, access an ATM, etc. without using an authentication transaction as described herein. Authentication transactions may be requested by the user and/or by any other component of the environment. FIG. 8 is a flowchart showing one example of a process flow 400 that may be executed by a financial institution system 106, POS device 130, ATM 132 or other counterparty (referred to in FIG. 8 as the counterparty system) to a user service request to determine whether to request an authentication transaction.

At action 402, the counterparty system may receive an access request message. The access request message may be received directly from a user 103, such as the access request 252 to the ATM 132 described above. The access request may also be received from a mobile computing device 102 and/or other computing device 136 of the user 103. At action 404, the counterparty system may determine whether access request included and/or was accompanied by a request for an authentication transaction. If yes, the counterparty may proceed to a transaction sign-in at action 410. For example, the counterparty may request that the wallet management system 104 initiate a transaction at the mobile computing device 102 of the user.

If not, the counterparty system may determine at action 406 whether an authentication transaction is required for the user 103 and/or an account of the user implicated by the access request. In some examples, the financial institution system 106 and/or other counterparty my require the user 103 to use an authentication transaction, for example, if fraudulent or potentially fraudulent activity has been detected on an account of the user, the counterparty may request an authentication transaction. In some examples, when the counterparty is not the financial institution system 106, the counterparty (e.g., the POS device 130, ATM 132, etc.) may query the financial institution system 106 to determine whether an authentication transaction is required for the user 103. If not, then the counterparty and user may proceed to a standard sign-in at action 408. A standard sign-in may include suitable authentication from the user 103 such as, for example, a user name and password. If an authentication transaction is required for the user, then the authentication transaction sign-in may be performed, as described herein, at action 410.

Authentication transactions, as described herein, may be real transactions made to the user's financial account. Therefore, in some examples, authentication transactions may appear on a user's statement. In some examples, authentication transactions may be broken into a separate category or location on the user's statements. For example, transactions with a balance less than a threshold balance (e.g., 15 cents) may be considered authentication transactions and, therefore, may be listed at a distinct location on the user's statement. In some examples, the financial institution system 106 may generate a user statement with authentication transactions (e.g., transactions on the user's financial account below a threshold amount) at a separate position distinct from a listing of other transactions on the account.

Figure 9:
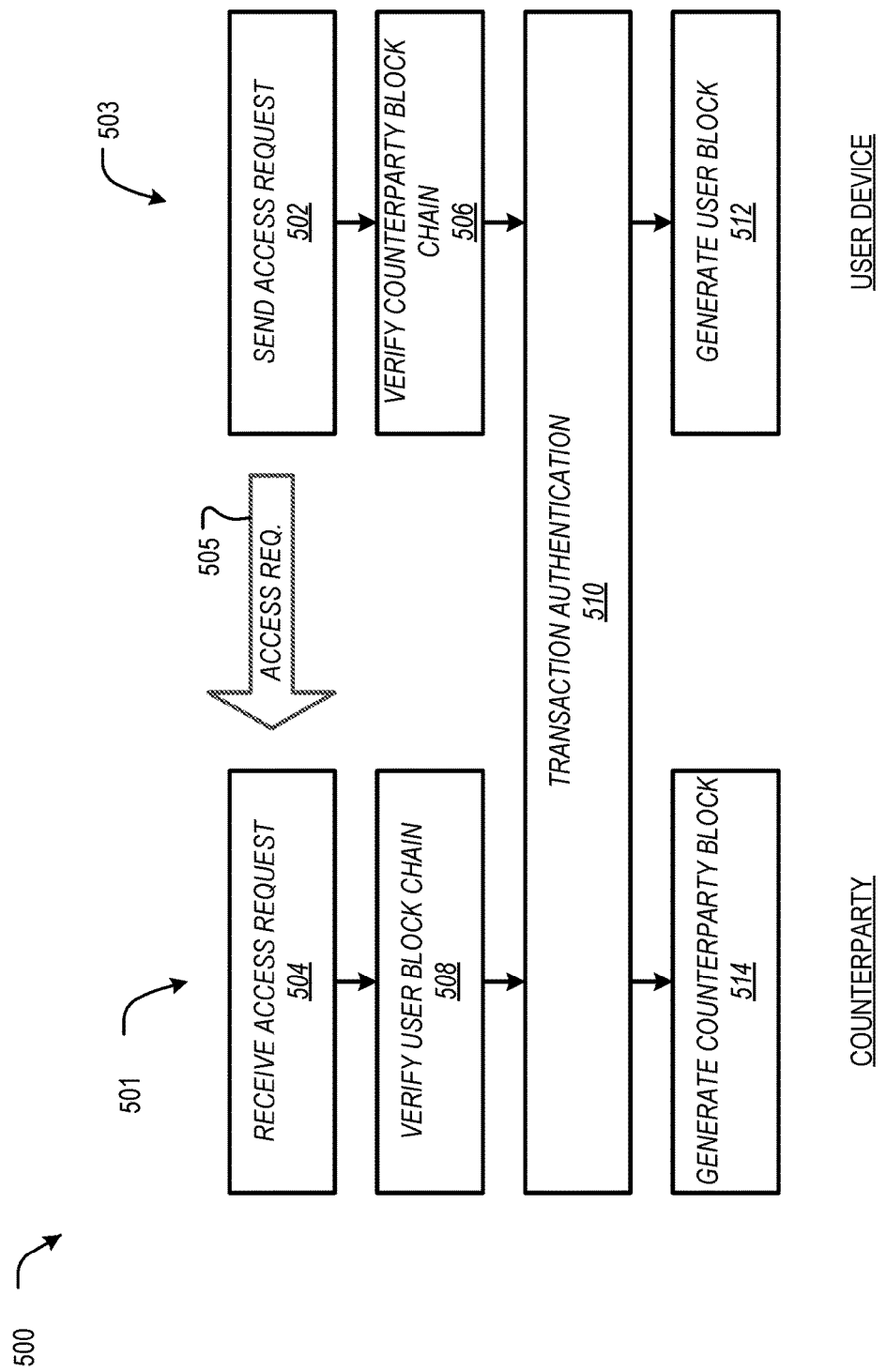
FIG. 9 is a flowchart showing one example of a process flow an authentication utilizing one or more block chains.

FIG. 9 is a flowchart showing one example of a process flow 500 for an authentication utilizing one or more block chains. The process flow 500 includes two columns 501, 503. Actions in the column 503 may be executed by a user computing device, such as any of the user computing devices 2A, 2B, 36 described herein. Actions in column 501 may be executed by a counterparty. The counterparty may be any party to be authenticated to the user device (or a user thereof) utilizing the authentications described herein. For example, with respect to the timing diagram of FIGS. 4-5, the counter party may be the financial institution system 106. With respect to the timing diagram of FIG. 6, the counterparty may be the POS device 130. With respect to the timing diagram of FIG. 7, the counterparty may be the ATM 132.

Generally, in the process flow 500, the user device and the counterparty utilize a transaction block chain in addition to the transactions shown and described herein. For example, the user device may comprise a user block chain data structure where each link in the block chain represents a transaction authentication conducted with a counterparty, such as a financial institution system, ATM, POS device, etc. Similarly, the counterparty may comprise a counterparty block chain data structure where each link represents a transaction authentication conducted with a user device. In addition to the transaction authentications described herein, the user device and/or counterparty may verify the block chain of the other party.

At action 502, the user device may send an access request message 505 to the counterparty. The access request message 505 may be similar to the other access request messages described herein. In some examples, (e.g., where the counterparty is a POS device), the access request message 505 may be or include a payment request. The counterparty may receive the access request message 505 at action 504. At action 508, the counterparty may verify a user block chain. The counterparty may verify the user block chain, for example, by verifying a cryptographic signature of the user and/or of a transaction counterparty for some or all of the links of the user block chain. The transaction counterparty for a link of the user block chain may be any counterparty with whom the user device has transacted including, for example, the counterparty of column 501. In some examples, the user block chain may be publicly available. For example, the counterparty may already possess the user block chain and/or may request it from a third party (e.g., a block miner system) or from the user device. Also, in some examples, verifying the user block chain may be computationally expensive. Accordingly, the counterparty may utilize one or more block miner systems 5 to verify the user block chain.

At action 506, the user device may verify the counterparty block chain. The user device may verify the counterparty block chain, for example, by verifying a cryptographic signature of the counterparty and/or of a transaction user device for some or all of the links of the counterparty block chain. The transaction user device for a link of the counterparty block chain may be any user device with whom the user device has transacted including, for example, the user device of column 503. In some examples, the counterparty block chain may be publicly available. For example, the user device may already possess the counterparty block chain and/or may request it from a third party (e.g., a block miner system) or from the counterparty. Also, in some examples, verifying the counterparty block chain may be computationally expensive. Accordingly, the user device may utilize one or more block miner systems 5 to verify the counterparty block chain.

At action 510, the user device and counterparty may engage in a transaction authentication, for example, as illustrated herein in FIG. 1 and FIGS. 4-7. At the conclusion of the authentication, for example if the authentication is successful, the user device may generate a new user block for the user block chain at action 512. Similarly, the counterparty may generate a new counterparty block for the counterparty block chain at action 514. The new blocks may be transmitted, for example, to one or more block miner systems, which may verify the blocks and add them to the respective user and counterparty block chains.

Figure 10:
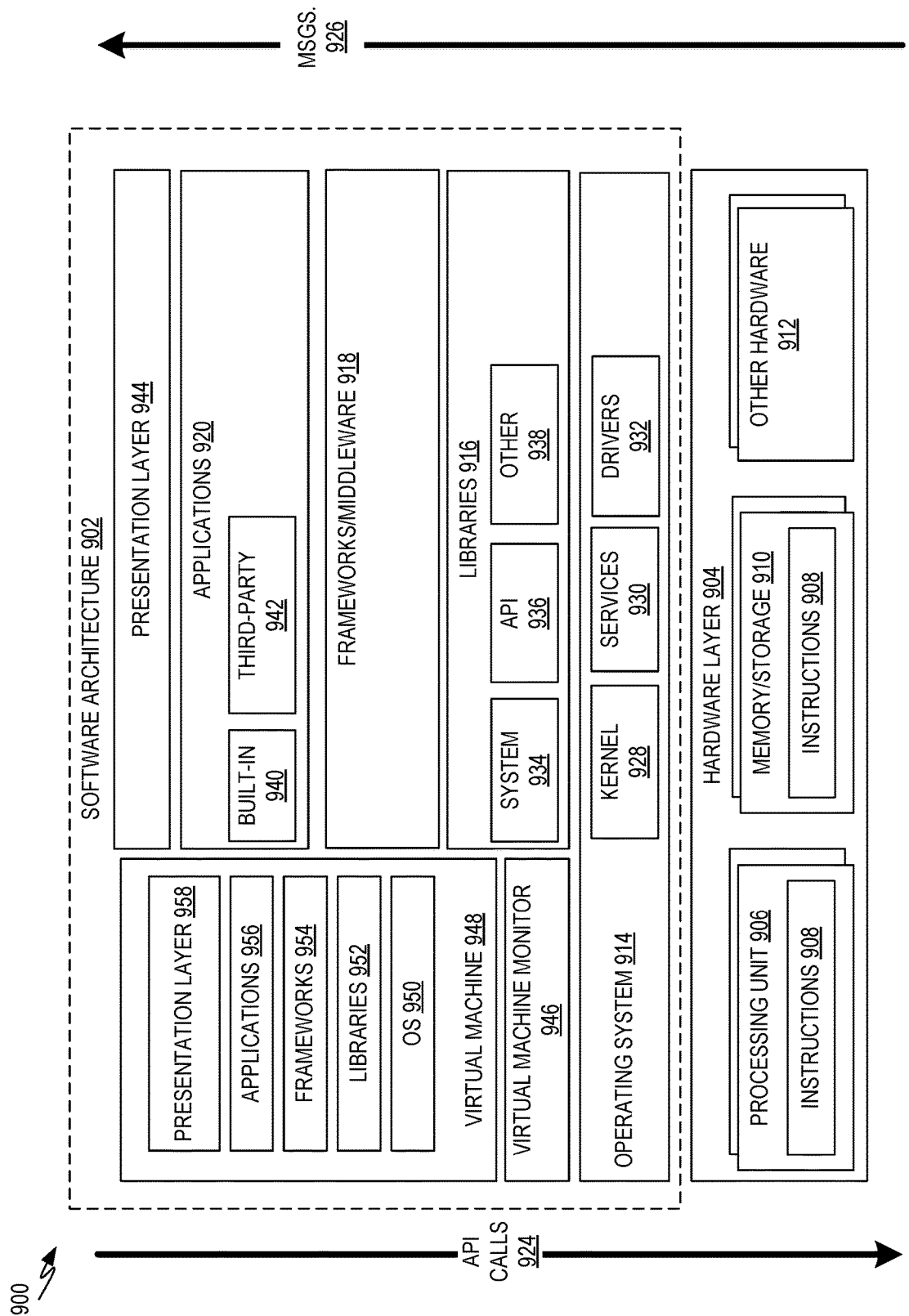
FIG. 10 is a block diagram showing one example of a software architecture for a computing device.

FIG. 10 is a block diagram 900 showing one example of a software architecture 902 for a computing device. The architecture 902 maybe used in conjunction with various hardware architectures, for example, as described herein. FIG. 10 is merely a non-limiting example of a software architecture and many other architectures may be implemented to facilitate the functionality described herein. The software architecture 902 may be executed on hardware such as, for example, a mobile computing device 2, 2A, 2B, 102, 130, all or part of a wallet management system 4, 104, all or part of a financial institution system 6, 106, all or part of a POS device 30, 130, all or part of an ATM 32, 132, etc. A representative hardware layer 904 is illustrated and can represent, for example, any of the above referenced computing devices. In some examples, the hardware layer 904 may be implemented according to the architecture 300 of FIG. 3 and/or the architecture 1100 of FIG. 11.

The representative hardware layer 904 comprises one or more processing units 906 having associated executable instructions 908. Executable instructions 908 represent the executable instructions of the software architecture 902, including implementation of the methods, modules, components, and so forth of FIGS. 1-2 and 4-8. Hardware layer 904 also includes memory and/or storage modules 910, which also have executable instructions 908. Hardware layer 904 may also comprise other hardware as indicated by other hardware 912 which represents any other hardware of the hardware layer 904, such as the other hardware illustrated as part of hardware architecture 1100.

In the example architecture of FIG. 10, the software 902 may be conceptualized as a stack of layers where each layer provides particular functionality. For example, the software 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 includes built-in applications 940 and/or third party applications 942. Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. For example, the wallet manager system 104 and/or financial institution systems 106 may be executed on one or more virtual machines executed at one or more server computing machines. In the example of FIG. 10, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Figure 11:
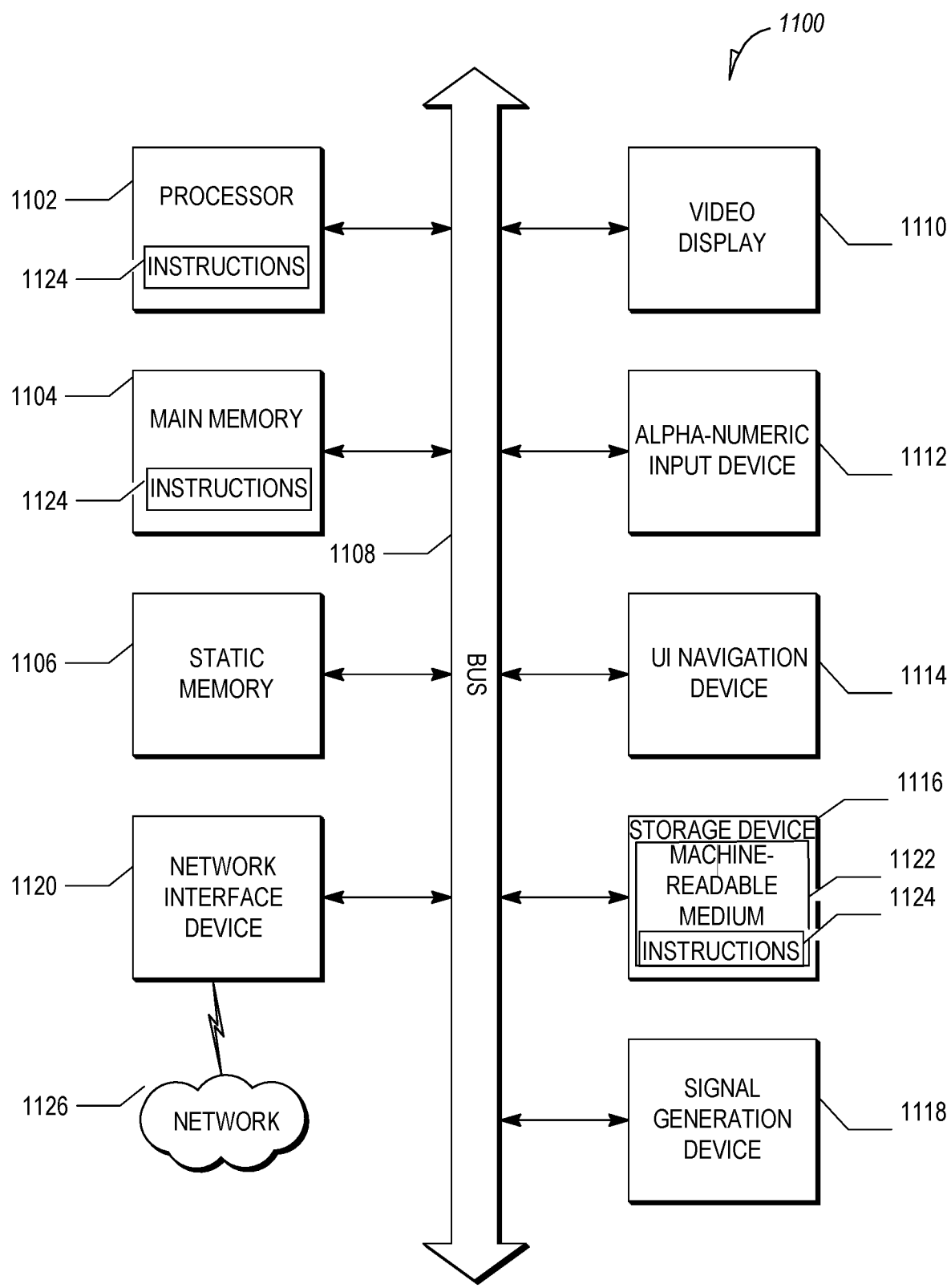
FIG. 11 is a block diagram illustrating a computing device hardware architecture, within which a set or sequence of instructions can be executed to cause the machine to perform examples of any one of the methodologies discussed herein.

FIG. 11 is a block diagram illustrating a computing device hardware architecture 1100, within which a set or sequence of instructions can be executed to cause the machine to perform examples of any one of the methodologies discussed herein. For example, the architecture 1100 may execute the software architecture 902 described with respect to FIG. 10. The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1100 includes a processor unit 1102 comprising at least one processor (e.g., a central processing unit (CPU), a graphics processing unit (GPU) or both, processor cores, compute nodes, etc.). The architecture 1100 may further comprise a main memory 1104 and a static memory 1106, which communicate with each other via a link 1108 (e.g., bus). The architecture 1100 can further include a video display unit 1110, an alphanumeric input device 1112 (e.g., a keyboard), and a user interface (UI) navigation device 1114 (e.g., a mouse). In some examples, the video display unit 1110, input device 1112 and UI navigation device 1114 are incorporated into a touch screen display. The architecture 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 can also reside, completely or at least partially, within the main memory 1104, static memory 1106, and/or within the processor 1102 during execution thereof by the architecture 1100, with the main memory 1104, static memory 1106, and the processor 1102 also constituting machine-readable media. Instructions stored at the machine-readable medium 1122 may include, for example, instructions for implementing the software architecture 902, instructions for executing any of the features described herein, etc.

While the machine-readable medium 1122 is illustrated in an example to be a single medium, the term "machine-readable medium" can include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for authenticating a mobile computing device and a financial institution system, the system comprising:
    the mobile computing device comprising at least one processor and a memory in communication with the at least one processor, wherein the mobile computing device is programed to:
    send an access request message to the financial institution system, the access request message sent by a financial services application executed at the mobile computing device;
    receive, by a mobile wallet application executing at the mobile computing device and from a second server system, a transaction request message requesting authorization for a transaction on an account associated with the mobile computing device, the transaction initiated by the financial institution system, the transaction request message including an indication of a transaction amount and an indication of the financial institution system;
    responsive to the transaction request message, display by the mobile wallet application a prompt to a user of the mobile computing device to authorize the transaction, the prompt comprising an indication of the transaction amount and an indication of the financial institution system;
    receive, by the mobile wallet application and from the user, an authorization for the transaction;
    send, by the mobile wallet application and to the second server system, an authorization message indicating that the transaction is authorized; and
    receive, by the financial services application and from the financial institution system, summary data comprising an indication of the transaction amount.

2. The system of claim 1, wherein the transaction comprises a debit of a transaction amount to the account and a credit of the transaction amount to the account.

3. The system of claim 1, wherein the transaction request message comprises financial institution system data identifying the financial institution system.

4. The system of claim 1, wherein the mobile computing device is further programmed to:
    receive biometric data from the user; and
    determine that the biometric data matches reference biometric data for the user.

5. The system of claim 1, wherein receiving the authorization from the user comprises receiving password data from the user.

6. The system of claim 1, wherein the mobile computing device is further programmed to send a payment request message to a point of service (POS) device, wherein the summary data is received from the POS device.

7. The system of claim 1, wherein the mobile computing device is further programmed to:
    execute a first application to send the access request message to the financial institution system; and
    execute a second application to receive the transaction request message and to prompt the user to authorize the transaction.

8. The system of claim 1, wherein the mobile computing device is also programmed to verify a block chain of the financial institution system, wherein the block chain comprises a plurality of transactions including the financial institution system.

9. A method comprising:
    sending, by a financial services application executing at a mobile computing device, an access request message to a financial institution system;
    receiving, by a mobile wallet application executing at the mobile computing device and from a second server system; a transaction request message requesting authorization for a transaction on an account associated with the mobile computing device, the transaction initiated by the financial institution system, the transaction request message including a transaction amount;
    responsive to the transaction request message, displaying, by the mobile wallet application, a prompt to a user of the mobile computing device to authorize the transaction, the prompt comprising an indication of the transaction amount and an indication of the financial institution system;
    receiving, by the mobile wallet application and from the user, an authorization for the transaction;
    sending, by the mobile wallet application and to the second server system, an authorization message indicating that the transaction is authorized; and
    receiving, by the financial services application and from the financial institution system, summary data describing the transaction amount.

10. The method of claim 9, wherein the transaction comprises a debit of a transaction amount to the account and a credit of the transaction amount to the account.

11. The method of claim 9, wherein the transaction request message comprises financial institution system data identifying the financial institution system.

12. The method of claim 9, further comprising:
    receiving biometric data from the user; and
    determining that the biometric data matches reference biometric data for the user.

13. The method of claim 9, wherein receiving the authorization from the user comprises receiving password data from the user.

14. The method of claim 9, further comprising sending a payment request message to a point of service (POS) device, wherein the summary data is received from the POS device.

15. The method of claim 9, further comprising:
    executing a first application to send the access request message to the financial institution system; and executing a second application to receive the transaction request message and to prompt the user to authorize the transaction.

16. The method of claim 9, further comprising verifying a block chain of the financial institution system, wherein the block chain comprises a plurality of transactions including the financial institution system.

17. A non-transitory machine-readable medium comprising instructions thereon that, when executed by a mobile computing device, cause the mobile computing device to perform operations comprising:

sending, by a financial services application executing at the mobile computing device, an access request message to a financial institution system;

receiving, by a mobile wallet application executing at the mobile computing device and from a second server system, a transaction request message requesting authorization for a transaction on an account associated with the mobile computing device, the transaction initiated by the financial institution system, the transaction request message including a transaction amount;

responsive to the transaction request message, displaying, by the mobile wallet application a prompt to a user of the mobile computing device to authorize the transaction, the prompt comprising an indication of the transaction amount and an indication of the financial institution system;

receiving, by the mobile wallet application and from the user, an authorization for the transaction;

sending, by the mobile wallet application and to the second server system, an authorization message indicating that the transaction is authorized; and receiving, by the financial services application and from the financial institution system, summary data describing the transaction amount.

\* \* \* \* \*

UNITED STATES PATENT AND TRADEMARK OFFICE
CERTIFICATE OF CORRECTION

Page 1 of 1

PATENT NO. : 10,762,505 B1
APPLICATION NO. : 15/180711
DATED : September 1, 2020
INVENTOR(S) : Morris et al.

It is certified that error appears in the above-identified patent and that said Letters Patent is hereby corrected as shown below:

In the Claims

In Column 18, Line 30, in Claim 9, delete "system;" and insert --system,-- therefor Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*